June 14, 1938. S. C. RODESS 2,120,262
BIRD CAGE
Filed Feb. 24, 1936 4 Sheets-Sheet 1

Inventor
S. C. Rodess.
by Hazard and Miller
Attorneys.

June 14, 1938.　　S. C. RODESS　　2,120,262
BIRD CAGE
Filed Feb. 24, 1936　　4 Sheets-Sheet 2

Inventor
S. C. Rodess
by Hazard and Miller
Attorneys.

June 14, 1938.   S. C. RODESS   2,120,262
BIRD CAGE
Filed Feb. 24, 1936   4 Sheets-Sheet 3
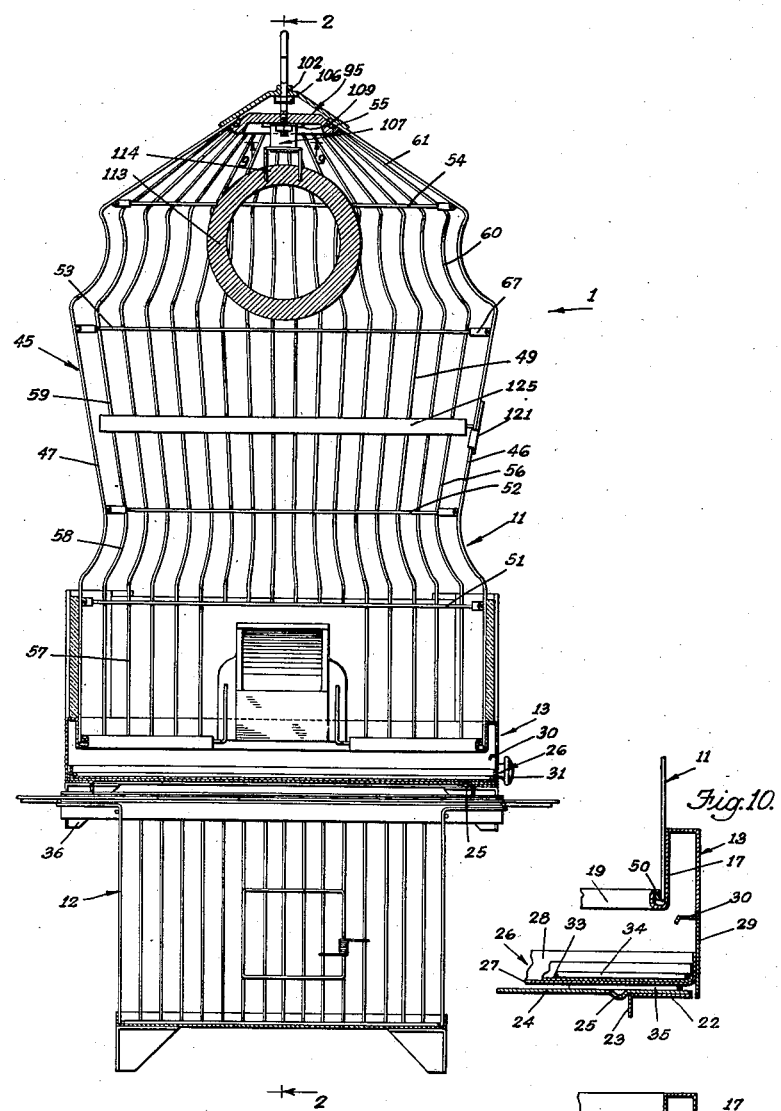

June 14, 1938.  S. C. RODESS  2,120,262
BIRD CAGE
Filed Feb. 24, 1936  4 Sheets-Sheet 4
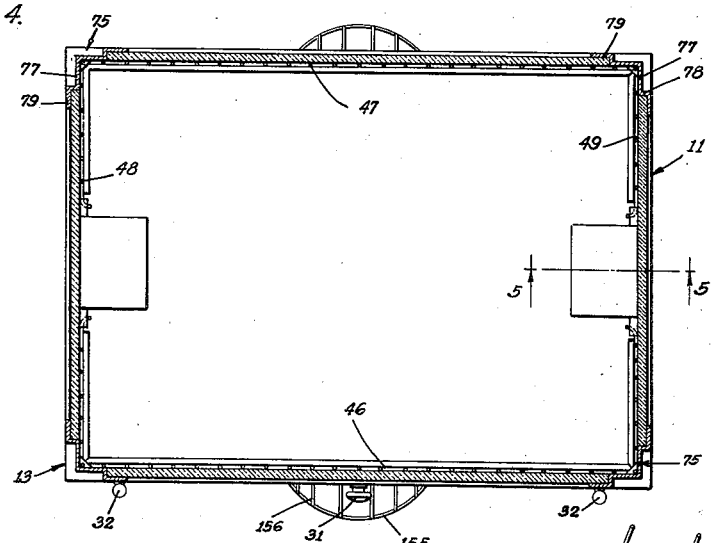
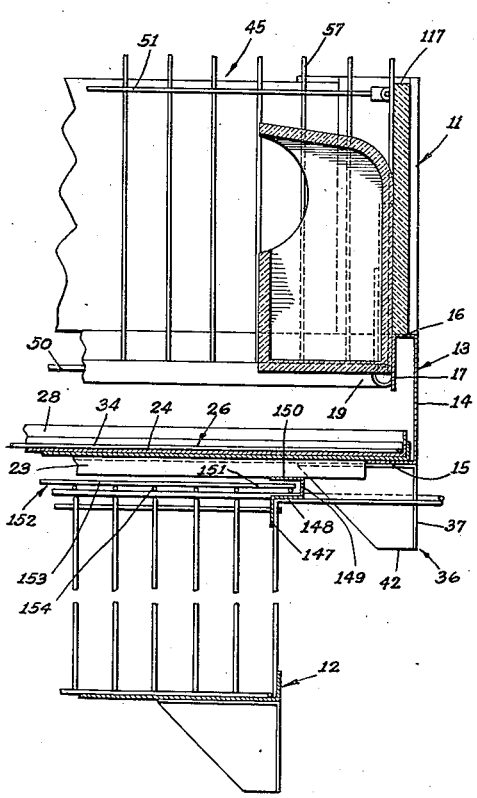
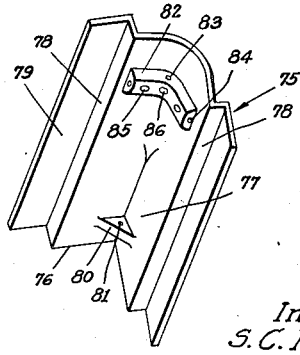
Inventor
S. C. Rodess
by Hazard and Miller
Attorneys.

Patented June 14, 1938

2,120,262

UNITED STATES PATENT OFFICE 2,120,262

BIRD CAGE

Samuel C. Rodess, Huntington Park, Calif.

Application February 24, 1936, Serial No. 65,346

12 Claims. (Cl. 119—17)

My invention relates as to one of its main features to what might be termed a two story bird cage, in which the lower part of the cage is provided with a bird bath and provision for opening the floor of the upper part of the cage assembly so that the bird can pass from the upper part of the cage to the section having the bird bath and may then be confined therein, the upper and lower sections may be readily disassembled so that the lower section with the bird bath may be placed in a location in a house so that the bird will not damage any furniture or the like by flicking water from the bird bath, and the main portion of the cage may then be cleansed while the bird is confined in the bird bath structure. Another feature of my invention therefore involves the arrangement for assembling and disassembling the lower or bird bath portion of the cage from the upper part, the upper part being designed to be suspended in the usual manner after disassembling from the lower portion having the bird bath.

A detail feature of the bird bath and main cage assembly comprises forming a lower cage with a frame having openings in which the legs of the main cage may be inserted and thus center one cage over the other. The bird bath cage is provided with a removable wire grid at the top. The main cage has a removable tray and also a removable floor, therefore, when the tray, floor and grid are removed and the main cage is located resting on the bird bath cage, there is a free passage for the bird from one portion of the bird cage assembly to the other.

Another object and feature of my invention relates to the manner of assembling or attaching the side or wall wires of the main portion of the cage to a peripheral stamped metal base strip, this base strip being provided with a downwardly and inwardly curled edge which grips the lower edges of the individual wires forming the side of the cage and this bead when crimped grips the wires and forms a closed bead preventing accumulation of dirt or the like.

Another object and feature of my invention is in the corner connections of the side wall members of the frame. This includes providing metal sleeves at the corners, these being preferably formed into a corner curve in which individual horizontal wires may be inserted and crimped in the sleeve. Another detailed feature is in the corner bracket which engages a vertical corner wire and also has horizontal wires crimped therein, the bracket also having flanges to hold and retain glass plates on the sides of the cage.

Another object and feature of my invention is the construction of a hood or cap on the top of the cage, this being formed in an upper and a lower element which may be clamped together by a bolt and these members grip a binding wire on a sloping roof section of the cage. In addition, the bolt has an eye for suspension of the upper cage section, and attached to the bolt there is a hook for suspending a bird swing.

Another main object and feature of my invention which develops from the manner of assembly is that the wires forming the main portion of the sides and the sloping top of the main cage are constructed of separate panels, that is, the two sides and the two ends. This permits plating of each element of the cage which it is desired to have plated before the assembly, thus the wires on the other parts which require a bright finish may be buffed after plating. This plating also includes the corner sleeves, which, if desired, may be secured to upright corner wires, then after the complete plating and polishing of the bright metal parts, the horizontal wires of the side panels may be crimped into corner sleeves by special tool without marring the sleeves.

Another object and feature of my invention in having the bird bath portion of the cage as a separate unit is that this unit may be used for stock birds, and on making a sale the merchant may transfer a bird from the bird bath or stock cage to the main cage by merely placing these cages in assembly position and moving the upper wire grid, or cover of the lower cage, the floor and the pan of the upper cage, thus it is not necessary to catch each individual bird by hand.

My invention is illustrated in connection with the accompanying drawings, in which;

Fig. 3 is a vertical section on the line 3—3 of Fig. 2 in the direction of the arrows.

Fig. 4 is a horizontal section on the line 4—4 of Fig. 2 in the direction of the arrows, showing details of the upper or main cage.

Fig. 5 is a vertical section on the line 5—5 of Fig. 4, the sketch being enlarged.

Fig. 6 is a horizontal section on the line 6—6 of Fig. 2 to illustrate the corner joint.

Fig. 7 is a section similar to Fig. 6, showing a modified form of corner joint.

Fig. 8 is an inside perspective view of a corner bracket.

Fig. 10 is an enlarged portion of the lower part of the main cage, such as shown in Fig. 3.

Fig. 11 is a partial section similar to Fig. 10, illustrating part of the bottom molding prior to assembly.

Fig. 12 is a vertical section on the line 12—12 of Fig. 1 showing the mounting of the spring perch.

In my invention I employ an upper or main cage 11 which is designed to rest and be supported on the lower or secondary cage 12, such cage being provided with a bird bath, the latter cage being of such a type that it may be readily moved after separation of the two cages and after the bird has descended from the upper to the lower cage to a place where the spray of water and the like from the bird bath will not injure the main cage or the house furnishings.

Figure 13:
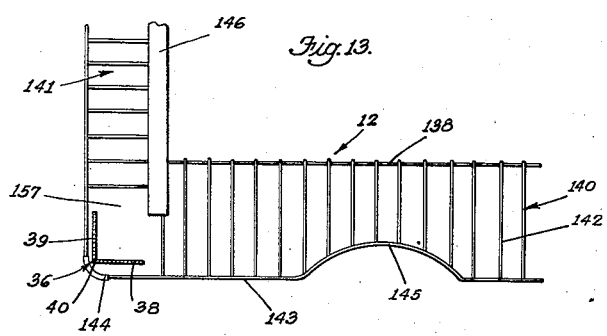
Fig. 13 is a detail horizontal section on the line 13—13 of Fig. 1.

In the following description, the upper or main cage is first described in detail. This employs a peripheral base molding 13 (note particularly Figs. 5, 10 and 11). Such molding has a wall plate 14, an inturned lower shelf 15, a shoulder plate 16, a depending inner wall plate 17, and a U-shaped upwardly bent section 18, which, when curled inwardly, forms the bead 19. At the front the wall plate 14 has a cutout section on the lines 20 and 21, leaving a transverse strip 22 with a downturned angle 23. A floor plate 24 rests on the shelf 15 at the ends and back of the cage and on the transverse strap 22 at the front side of the cage. This plate has a downwardly pressed nub 25 which engages the angle formed by the downturned angle plate 23 and the strip 22 which resists displacement of this floor plate when the tray 26 is removed. Such tray has a bottom 27, four side flanges 28, and an ornamental front wall strip 29, this strip having an inwardly turned shoulder 30. Knobs 31 and 32 are secured to the front wall strip 29, which strip is secured to the tray or pan so that this may readily be removed through the opening formed on lines 20 and 21. The tray is designed to have a removable covering 33 of paper, held in place by a rectangular wire 34 wedging the paper into the corners of the pan. A pulling wire 35 is soldered to the floor plate 24 and preferably extends in a curve surrounding the outside of downwardly pressed nub 25. This gives a slightly raised portion which may be engaged by the finger for removal of the floor plate after removal of the tray from the bottom of the main cage. This also functions to force the tray upwardly at its front edge and to compensate for the slight sag of the strap 22. Extending below the base molding 13 there are four legs 36, these legs having two side walls 38 and 39 and meeting at the right angular corner 40 (note Figure 13). These side walls also have a sloping edge 41 and a horizontal lower edge 42.

The wire wall and roof structure of the cage, designated by the assembly numeral 45 is constructed of four main panels, of which they may be considered the front panel 46, rear panel 47 and two end panels 48 and 49. Each of these panels is constructed with a lower horizontal wire 50 and a series of intermediate wires, of which the wire 51 is the same length as the wire 50, the wire 52 is slightly shorter, the wire 53 is longer than the wire 52, and the wire 54 is again shorter than the wire 53, and at the apex or roof portion there is a wire 55. Each of these horizontal wires is intersected by an upright wire 56, these wires having a vertical section 57 joining the horizontal wires 50 and 51, an inwardly curved section 58 and an outwardly sloping section 59. These portions connect horizontal wires 51, 52 and 53. An inward curved section 60 connects between the horizontal wires 53 and 54 and converging roof wires 61 extend from the wire 54 to the apex wire 55.

The corner construction 65 has corner upright wires 66 (note particularly Figs. 6 and 7), and secured to the corner wires at various elevations there are connecting sleeves 67, such sleeves are illustrated as curved, forming a quarter circle and having perforations through which the corner wire 66 extends. Each sleeve has a socket 68. The ends of each of the horizontal wires 51, 52, 53 and 54 may be threaded, as indicated at 69, and secured to the sleeve by an indentation 70 of such sleeve. As an alternative construction (shown in Fig. 7), each of the horizontal wires 51, 52, 53 and 54 may have a notch 71 or an annular groove in which the indentation 70 in the sleeve engages. The purpose of this connection is detailed hereinunder.

Figure 1:
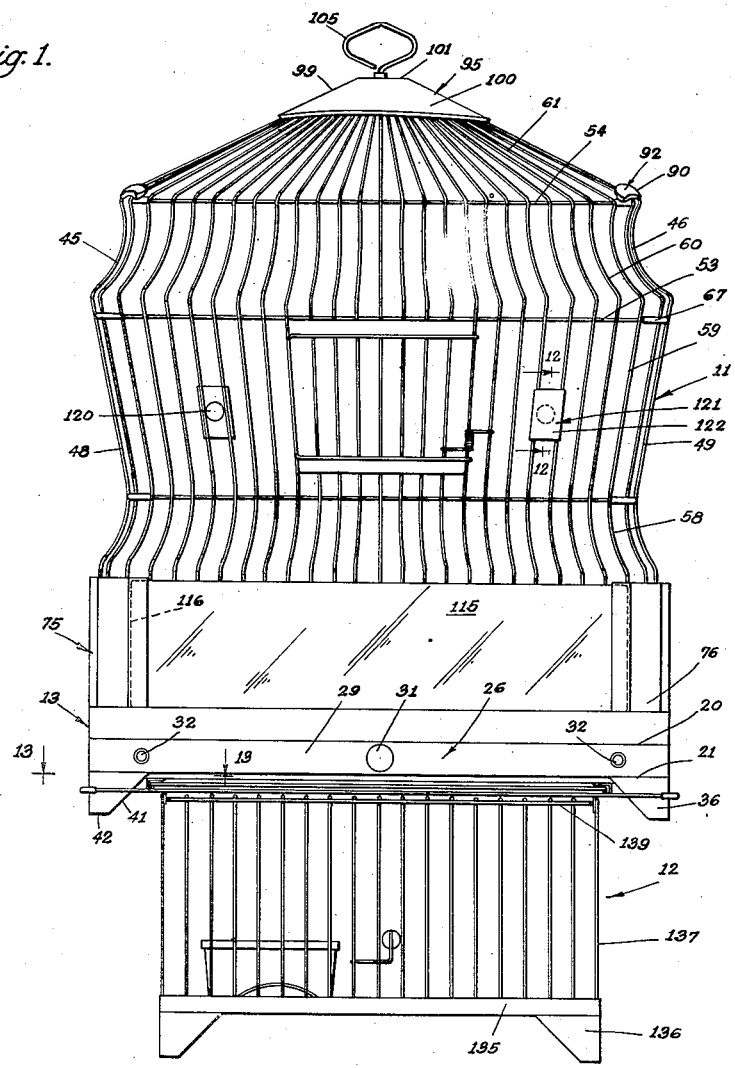
Fig. 1 is a side elevation of the bird cage assembly showing the upper cage and the lower bird bath cage.

At the four corners of the cage there are corner brackets 75 (note Figs. 1 and 8). Each of these brackets has a squared lower end 76 resting on the shoulder plate 16. It has a corner section 77 extending upwardly, two internal vertical shoulders 78 and two vertical edge plates 79. A corner brace 80 is located adjacent the bottom and on the inside of the corner section 77 and has a perforation 81. A sleeve 82 is formed integral with the corner section adjacent its upper edge. This has a corner perforation 83 and end sockets 84. The corner wires 66 at each corner extend downwardly through the perforations 83 and 81 and into the U-shaped section 18 which is subsequently bent to form a bead. The ends of the horizontal wire 51 are inserted in the sockets 84 and are crimped therein by indentations 85. The upright wire 66 is likewise held in the sleeve 82 by an indentation 86 of the sleeve. It will thus be seen that the corner bracket and the curved sleeves 65 are rigidly secured to each of the corner upright wires 66.

The horizontal wires 54 have their ends connecting in an ornamental sleeve 90, which sleeve is formed with sockets 91 in which the ends of the wires 54 may be inserted and gripped therein and on the top there is an ornamental design structure 92.

The apex construction 95 (note particularly Figs. 1, 2 and 3) consists of a lower plate 96 having a downturned peripheral portion 97 forming marginal grooves 98. These grooves engage the horizontal wires 55 and the ends of the group of wires 61, where these are welded together. It is also preferable to weld the upper ends of the corner wires 66 to one of these wires 55.

Figure 9:
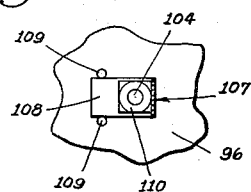
Fig. 9 is a detail horizontal section on the line 9—9 of Fig. 2 in the direction of the arrows.

A pyramid shaped cover plate 99 has sloping sides 100 which extend over and beyond the grooves 98. These plates have a flat top surface 101 with a perforation 102. The plate 96 also has a perforation 103. Through these perforations extends a bolt 104; such bolt has a head 105 in the form of an eye for suspending the upper portion of the cage. A nut 106 (note Fig. 2) is used to hold the bolt and the eye securely to the pyramid plate 99. A hook 107 has a top plate 108 (note Fig. 9) with a perforation through which the bolt extends. This plate is centered by two downwardly extending nubs 109 on the plate 96. The nut 110 is then tightened, thus securing the plates 96, the wires 55 and the roof wires to the pyramid plate 99. After these parts are assembled the hook is bent downwardly having a depending strap portion 111 and an upwardly bent hook end 112, the hook thus acts as a nut lock with the nut 110 and also as a hook for suspension of the swinging ring 113, this ring having an eye 114 engaging the hook 107.

Figure 2:
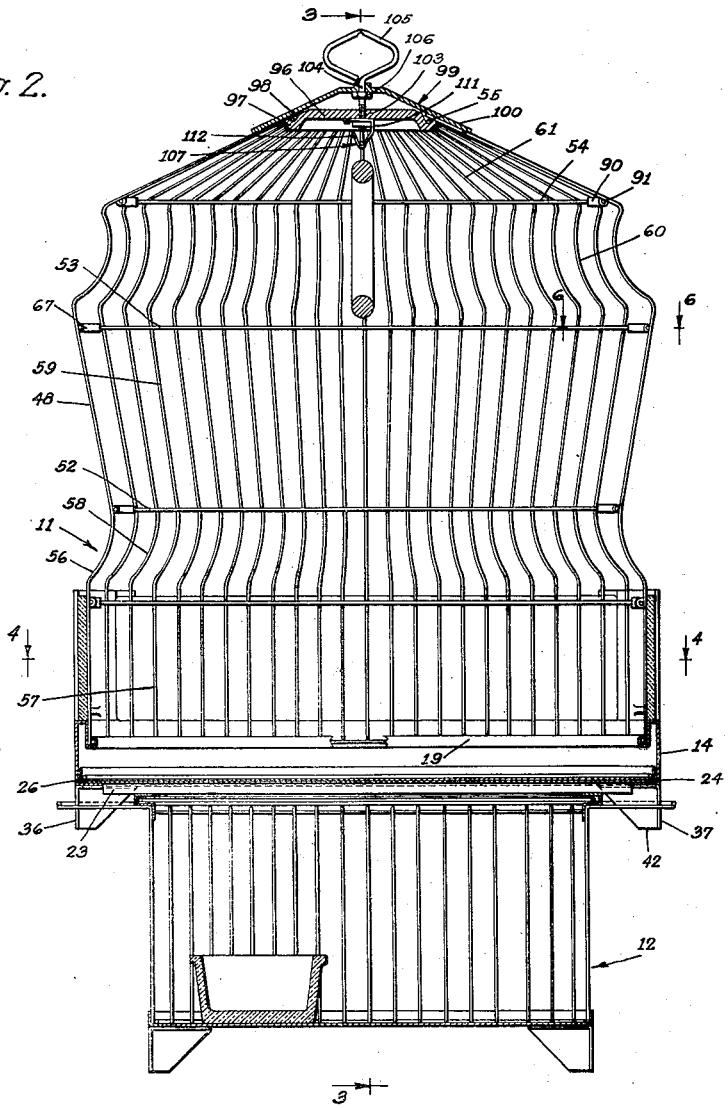
Fig. 2 is a vertical section taken on the line 2—2 of Fig. 3 in the direction of the arrows.

The lower wire 50, with the lower ends of the upright wires secured thereto by welding or the like, is then crimped in the U-shaped structure 18 (note Fig. 11) to form the bead 19 (note Figs. 2 and 10). This gives a construction securely attaching the side panels to the base molding 13. The panels are also secured firmly together and to the corner wires by the lower bracket plates 75 of Fig. 8, the sleeve 67 of Figs. 6 or 7, the ornamental sleeve 90 and the top cover 95 of the cage.

The object of making the wire panels forming the sides of the cage in separate units before securing these to the bead 19 is to facilitate the metal plating and polishing or buffing on the wires, these being in relatively small units can be more readily placed in a plating bath than can the whole assembled cage, and moreover, after plating it is necessary to buff or polish the wires and this can be more readily done when they are in separate panels. The plating also includes plating the angle brackets 75 of Figs. 8, the sleeve 67, and the ornamental sleeves 90. The base frame may be plated as a separate unit.

Glass plates 115 are used on the four sides of the cage, each plate rests on the upper edge or shoulder plate 16 of the molding 13. The ends 116 of these glass plates or bevels fit inside the corner portions 78 and 79 of the corner brackets between such brackets and the portion 57 of the upright wires. The upper edge 117 of these glass plates preferably extends slightly above the horizontal wires 51.

The flexible perch construction designated by the assembly numeral 120 and illustrated in detail in Fig. 12 includes a socket structure 121 having a front plate 122 and a rear plate 123 of less height, both welded or secured to upright wires as illustrated in Fig. 1, leaving a socket 124 between these plates. The wooden perch bar 125 has a resilient metal hook 126, this having a horizontal section 127 inserted in the wooden bar and a down-turned end 128 fitting in the socket 124. As this is resilient at the angular bend designated 129 the perch may have an up and down spring movement. However, it is more or less stiff to a horizontal swinging movement.

The hook 126 may be made from a flat strip of metal or from a wire having the two ends spaced apart. It will be understood that the upper part of the cage may have the usual doors and door openings as well as provisions in the usual manner for the feed boxes.

The secondary or lower cage 12 is constructed as follows as to its details: This has a peripheral base molding 135 with legs 136, and extending upwardly from this molding there are the vertical wires 137 forming the walls of the cage. These walls terminate at a horizontal edging wire 138, there being preferably a horizontal wire 139 located on the outside and below such wires. The upright wires are preferably bent horizontally outwardly forming a relatively wide shelf 140 on the front and the back and narrower shelves 141 at the sides. The outer ends of these horizontal wires, designated individually at 142, are connected to a peripheral wire 143. This wire is preferably formed in side sections which sections are connected at the corners by sleeves 144 similar to the prior described sleeve construction. At the front and the rear side there is an inwardly curved portion 145 to facilitate a finger grip of the grid.

A pair of transverse guides 146 are located at the ends of the opening formed by defining wires 138. This preferably has a down-turned strip 147 (note Fig. 5), a horizontal shoulder strip 148, an upright edge 149, and a cover strip 150, forming thus a horizontal guide edge 151. In this is located a removable grid cover 152, this being formed of intersecting horizontal wires 153 and 154. These terminate at a marginal wire 155 of which at the front and back there is an outwardly bent section 156, the cross wires extending outwardly to this extension and providing a finger grip.

The marginal wire 143 at the corners, together with the individual wires 142 of the shelves provide centering openings 157 at the corners to receive legs of the upper cage and thus center the upper cage directly over the lower cage. Hence, when it is desired to allow a bird to descend from the upper to the lower cage and the cages are thus placed one over the other the grid 152, which forms part of the top closure of the lower cage, may be removed. The tray or pan of the upper cage may then be pulled outwardly and removed and the bottom plate of the upper cage may also be removed, thus allowing a free passage between the upper and lower parts of the cage assembly. Hence, the bird may be allowed to descend to the lower part of the cage, the grid may be replaced, and the upper cage removed entirely from the lower cage, this facilitating cleaning of the upper cage. Manifestly, when it is desired to return the bird to the upper cage the two cage elements are assembled and the reverse procedure as to the grids, pan and bottom of the upper cage is carried out and when the bird is safely in the upper cage this may be closed at the bottom and, if desired, removed from the lower cage.

It will be apparent in the apex construction 95 that grooves equivalent to 98 could be formed in the pyramid cover plate 99, this being merely a reversal of parts to hold the wires 55. The corner wires 66 as above mentioned are welded at the top to the horizontal wires 55, and these corner wires after passing through the corner brackets 75 are also welded to the lower horizontal wire 50 prior to the formation of the bead 19. It will be understood that the corner wires are connected in place after the wire side panels have been plated and a small amount of welding in connecting the corner wires does not mar the other wires of the cage.

The lower or secondary cage is purposely made smaller than the main cage so that the opening between the cages can be made a large size as to the lower cage and may be smaller than the full bottom size of the upper cage. The shelf on the lower cage projects laterally a sufficient distance to center and support the upper or main cage.

Various changes may be made in the details of construction without departing from the spirit or scope of the invention as defined by the appended claims.

I claim:

1. A bird cage assembly comprising a lower cage having an outwardly extending shelf at the top with a peripheral wire, transverse guides above the shelf, a removable wire grid slidable in said guides and having a portion extending over the shelf, an upper cage having a base molding with legs, said legs extending into said openings of the lower cage to center the two cages, one relative to the other, the upper cage having a removable floor plate slidably mounted in the lower portion of the base molding, and a removable pan supported on the floor plate whereby when the pan, the floor plate, and the grid are removed, a free passage is provided between the two cages.

2. A bird cage having a base molding, a corner bracket resting on the molding at each corner of the cage, a plurality of wall panels each formed with upright wires intersected by horizontal wires, each panel being a unit adapted to be separately plated, each panel having a lowermost horizontal wire, a bead construction for connecting the panels to the base molding, means to attach horizontal wires of adjacent panels to the adjacent corner brackets, and a cover plate apex construction securing the upper ends of the panels.

3. A bird cage as claimed in claim 2 the corner wires at each corner of the cage each attached to the adjacent corner bracket and having its lower end secured to the bead of the base molding, the corner wires and horizontal wires thereby retaining the corner brackets in position on the base molding.

4. A bird cage as claimed in claim 2 connecting corner sleeves each having end sockets with the adjacent horizontal wires fitted therein, and means attaching said wires and the sleeves, the corner wires being also attached to the sleeves, thereby forming a connection by the corner wires between the corner brackets and the sleeves.

5. A bird cage as claimed in claim 2 the apex cover plate construction having a lower plate and an upper plate, the upper plate being pyramidal in shape as to its sides, there being grooves between the said plates, the upper ends of the upright panel wires being connected to an upper horizontal wire, such horizontal wire being secured in said grooves.

6. In a bird cage a base molding having a corner with a horizontal shoulder at the top, a corner bracket resting on said shoulder, said corner bracket having a corner brace with a perforation, an upright corner wire extending downwardly through said perforation, and means connected to the base molding to engage and retain the lower end of the upright corner wire.

7. In a bird cage as claimed in claim 6, the corner bracket having a sleeve secured thereto with a socket at each end of the sleeve, and two adjacent side panels each having upright wires and a horizontal wire, the ends of the horizontal wires being secured in the sockets of the sleeve of the bracket, said sleeve being upset to securely attach the ends of the horizontal wires and the panels to the sleeve of the bracket.

8. In a bird cage having side panels formed of upright wires, said wires at the top of the cage converging towards an apex and each panel having a horizontal upper wire connected to the upper ends of the upright wires of a panel, an apex cap construction having a lower plate with a groove and an upper plate of pyramid shape, the upper horizontal wires being caught on said groove between the lower plate and the pyramid plate, and a bolt securing said plates together.

9. In a bird cage, a base molding having a vertical wall plate, a shoulder plate at the top, a downwardly extending inner wall plate, a U-shaped upwardly bent section formed into a bead, a series of upright cage wires extending downwardly inside of the inner wall plate, and a horizontal bottom wire connected to the bottom portion of each upright wire, the lower horizontal wire and the ends of the upright wires being secured in the bead.

10. In a bird cage as claimed in claim 9, an inturned lower shelf connected to the lower portion of the wall plate, and a floor plate slidably mounted thereon and having a wire secured thereto on its upper side adjacent the front of the cage and adapted to form a finger grip for removing the floor plate from the said shelf, the wall plate having an opening at the front for the removal of the floor plate.

11. In a bird cage, a base molding having a top horizontal shoulder, a corner bracket having a corner portion fitted thereon, inturned shoulders and vertical edge plates, the shoulders and edge plates being adapted to engage the ends of glass plates resting on the shoulder of the base molding, an upright wire extending downwardly through the corner portion of the corner bracket and secured thereto, and means for attaching the lower end of such wire to the base molding.

12. An auxiliary bird cage for use for a bird bath comprising a cage structure having an outwardly extending horizontal shelf at the top with a peripheral wire, transverse horizontal guides above the shelf, and a removable wire grid slidable in the said guides and having a portion extending over the shelf, the said shelf being adapted to support an upper cage and the grid being removable and adapted to permit passage of a bird after removal of the grid between the auxiliary cage and another cage resting on the said shelf.

SAMUEL C. RODESS.